United States Patent Office 2,789,961
Patented Apr. 23, 1957

2,789,961

MIXTURES OF A HARD STYRENE POLYMER AND A COPOLYMER OF BUTADIENE WITH FUMARIC ACID DI-n-BUTYL ESTER AND SHAPED ARTICLES MADE FROM SUCH MIXTURES

Friedrich Hoelscher, Otterstadt, Pfalz, Germany, assignor to Badische Anilin- & Soda-Fabrik Aktiengesellschaft, Ludwigshafen (Rhine), Germany No Drawing. Application May 4, 1954,
Serial No. 427,649

Claims priority, application Germany May 9, 1953

7 Claims. (Cl. 260—45.5)

This invention relates to mixtures giving shaped articles of high impact strength and to shaped articles from such mixtures. More particularly this invention deals with blends of a hard styrene polymer and a copolymer of butadiene, fumaric acid di-normal-butyl ester and preferably a small amount of an unsaturated amide.

Polystyrene and copolymers of styrene belong to those thermoplastic plastics which are being produced at present on a large scale. These polymers can be processed in a simple manner by injection molding into shaped articles. Since polystyrene and the copolymers of styrene with other vinyl compounds, such as vinylcarbazole or acrylonitrile, have only a low impact strength, shaped articles prepared therefrom are very susceptible to shock. Attempts have therefore already been made to obviate this shortcoming by the addition of plasticizers or by polymerizing-in plasticizing monomers, including butadiene or acrylic acid butyl ester. According to another proposal, polystyrene is mixed with polymers or copolymers of butadiene in order to obtain plastic masses which have a better impact strength.

I have now found that mixtures of major proportions of polystyrene or copolymers having a high content of styrene with a copolymer of fumaric acid di-normal-butyl ester and butadiene containing about 1 to 10 mols of butadiene for each mol of the fumaric acid ester are especially valuable raw materials for the production of shaped articles having outstanding impact strength. These mixtures should preferably contain about 5 to 30% by weight of the copolymers of butadiene and fumaric acid dibutyl ester and about 70 to 35% by weight of polystyrene or styrene copolymers, with reference to the total weight of the mixture. It is preferable to use copolymers containing 3 to 7 mols of butadiene to each mol of the fumaric acid dibutyl ester. The mechanical properties of the shaped articles prepared from the said mixtures naturally vary according to the proportions in which the components are mixed and also to the molecular weight and molecular distribution. The impact strength of the shaped articles increases with the proportion of butadiene and fumaric acid dibutyl ester copolymer in the mixture and is as a rule between 40 and 120 kg. cm. per square centimeter.

The mixtures of plastics can be preferably prepared by bringing together aqueous dispersions of the individual polymers and separating the solid material from the resulting dispersion mixtures. The mixing of aqueous dispersions, which as a rule contain about 20 to 55% of polymer, offers no difficulty because these dispersions are of low viscosity. Of course it is also possible to work with dispersions of higher or lower concentration. The mixing vessel may be a standard type stirring vessel having a slowly rotating blade stirrer. The mixing can be carried out at room temperature, but it is also possible to work at higher or lower temperature, preferably between 5° and 50° C. The two dispersions can be allowed to run in together or one of the dispersions can be introduced first and the other be introduced later. In order to separate the polymer from the dispersion mixture, it is possible to carry out a precipitation with electrolytes or liquid precipitants, as for example formic acid, aluminum salts, magnesium salts, caustic soda solution, sodium chloride, methanol or ethanol, or the dispersion mixture can be evaporated to dryness, for example on spray roller driers or atomizing driers. When working with electrolytic precipitants it is preferable to use fairly dilute aqueous solutions of these precipitants which as a rule contain about 0.5 to 10% of the electrolyte with reference to the total weight of the solutions. These precipitants are added in such an amount that the dispersions flocculate completely, as can be seen when a sample thereof is filtered. No further precipitation must occur in the filtrate upon the addition of further precipitant. The flocculated dispersions can be freed from the bulk of the water by filtration or centrifuging or other mechanical separation methods. The wet material is then dried continuously or discontinuously in the conventional drying means, preferably at a temperature of 60° to 120° C. In order to facilitate the filtration or centrifuging of the flocculated mixtures, it is advisable to heat the aqueous system at 40° to 90° C. for some hours prior to these operations.

When drying non-flocculated dispersion mixtures on roller driers, the surfaces of the rollers should preferably have a temperature of 110° to 170° C. If it is desired to obtain pulverulent plastic mixtures, the material being dried should itself not feasibly be heated above 100° C.

Another possible method of preparing plastic mixtures according to this invention is by dissolving the individual polymers and mixing the resulting solutions. A powdered copolymer of fumaric acid dibutyl ester and butadiene, which has been prepared in aqueous emulsion, can also be incorporated into a polystyrene prepared by block or bead polymerization, on mixing rollers or an endless screw machine.

The polymer dispersions can be prepared in known manner by polymerizing the appropriate monomers in aqueous emulsion. The emulsion polymerization of styrene is described by C. E. Schildknecht in the book "Vinyl and related polymers" (John Wiley & Sons, New York, 1952) on pages 16–17. For copolymerization with styrene in this case those monomeric compounds are of special interest which like styrene form hard polymers by pure polymerization. Such monomers are for example acrylonitrile, methacrylic acid methyl ester, methyl acrylate, vinylcarbazole, vinylnaphthalene and acenaphthylene. These copolymers should preferably contain at least 50% of styrene. The usual catalysts and emulsifiers are used in the polymerization or copolymerization of the styrene. The molecular weight of the styrene polymers should preferably correspond to a K-value according to Fikentscher of 70 to 150. The best polymerization temperatures lie between 15° and 110° C.

The copolymerization of the butadiene with the fumaric acid dibutyl ester is preferably carried out at temperatures between —10° and +60° C. When working below 0° C., water-soluble organic liquids, such as glycerin or other alcohols, are added. Also in the polymerization of these two monomers in aqueous emulsion there are preferably used water-soluble peroxidic catalysts, such as potassium or ammonium persulfate and hydrogen peroxide, or other radical-forming catalysts. There may also be added activating agents, such as amines or metal salts, for the acceleration of the polymerization, or polymerization regulators.

Copolymers of butadiene and fumaric acid dibutyl ester are also of special interest which contain also small amounts, preferably up to 5% by weight and more specifically between 0.1 and 2% by weight, of acrylamide and/or methacrylamide with reference to the total weight of the copolymer. The small proportion of these unsaturated amides in the copolymers imparts to the plastic mixtures not only a high impact strength but also a very good stability to ageing. Moreover the aqueous dispersions of the copolymers containing amides are more stable than those of the copolymers which do not contain amides. The copolymerization and the processing of the plastic mixtures are carried out in the same way as with copolymers free from amides. For the rest, however, all the usual expedients and methods of operation which are already known in the emulsion-polymerization can be used for the emulsion-polymerization of butadiene with fumaric acid dibutyl ester.

The mixtures of the styrene polymers and the butadiene-fumaric acid dibutyl ester copolymers can be advantageously processed by injection molding or extrusion. They may, however, also be compression-molded or used for making profiles or coating electric cables by the spraying method. Before being made into shaped articles the initially pulverulent mixtures are preferably agglomerated by conventional methods, i. e. the plastic powder which contains air, is consolidated in the usual way on heated rollers or mixing screws, preferably at 150° to 200° C., to form compact masses which, if necessary, may then be comminuted to the usual grain size for injection molding. The articles prepared therefrom have not only an excellent impact bending strength, but also a high extensibility and a good heat resistance.

The following examples will further illustrate this invention but the invention is not restricted to these examples. The parts are parts by weight.

*Example 1*

For the preparation of a polystyrene dispersion:

An aqueous emulsion of monostyrene is prepared by stirring in an enamelled stirring vessel. For this purpose there are introduced into the vessel at room temperature 700 parts of desalted water, 42 parts of a 14% solution of the sodium salt of hydroxyoctadecane sulfonic acid in water, 0.6 part of potassium persulfate, 1.2 parts of sodium pyrophosphate and 300 parts of styrene. The pH is adjusted to 10 by the addition of a small amount of caustic soda solution. During the course of 90 minutes, the emulsion is heated while stirring to 60° C. and by corresponding regulation of the temperature the internal temperature of the emulsion is kept at 65° to 70° C. for 120 minutes. It is then heated to 95° C. in the course of 45 minutes, the mixture kept at this temperature for 45 minutes and then traces of non-polymerized styrene are removed by blowing a vigorous current of nitrogen over the surface of the liquid in the open vessel for 40 minutes. An about 30% polystyrene emulsion is obtained after cooling down.

*Example 2*

Preparation of dispersions of copolymers on the basis of butadiene and fumaric acid dibutyl ester:

(a) A monomer emulsion is prepared at room temperature in a pressure-tight stirring vessel from 12,000 parts of desalted water, 540 parts of a 14% solution of the sodium salt of hydroxyoctadecane sulfonic acid in water, 80 parts of the sodium salt of di-isobutylnaphthalene sulfonic acid, 20 parts of an addition product of 20 mols of ethylene oxide and octadecyl alcohol, 12 parts of potassium persulfate, 20 parts of sodium pyrophosphate, 1600 parts of fumaric acid di-normal-butyl ester and 2270 parts of butadiene. The pH of the aqueous phase is adjusted to 8 before the monomers are added. After stirring for 24 hours while keeping the mixture at 40° C., 14,900 parts of a 23.8% dispersion of a copolymer of butadiene and fumaric acid di-normal-butyl ester are obtained.

(b) A copolymer is prepared in the same apparatus and with the same substances as in (a) above, but the mixture of monomers which is subjected to polymerization also contains 56 parts of acrylamide. The resulting triple polymer is worked up as in (a).

(c) A triple copolymer is prepared as in (b) above, but it contains 0.7% of methacrylamide instead of acrylamide.

*Example 3*

The dispersions prepared according to Example 1 and 2 are mixed while stirring, 3050 parts of the polystyrene dispersion and 441 parts of the butadiene-fumaric acid ester copolymer dispersion 2(a) being used. The mixture is dried in conventional manner on a spray roller drier. The dry powder, after having been agglomerated on heated rollers or simple mixing screws can be used directly as an injection molding mass for the preparation of injection moldings.

The following characteristic values are measured on injection molded test rods. (Measurements by German industrial standard, hereinafter and in the following examples briefly referred to by the German denotation Din.)

Tensile strength: 500 kg. per sq. cm. (Din 53 455)
Extensibility: 15% (Din 53 455)
Impact strength: 60 to 70 kg. cm. per sq. cm. (Din 53.453)
Heat resistance according to Vicat: 90° C. (Din 57 302).

*Example 4*

A mixture of 2930 parts of the polystyrene dispersion described in Example 1 and 500 parts of the dispersion of the copolymer described in Example 2(b) is dried in an atomizing drier (of the Nubilosa apparatus type) with an air outlet temperature of 60° to 70° C. A dry powder is obtained which is made up into an injection molding mass in conventional manner in a double endless screw with an inlet temperature of 60° C. and a temperature of 170° to 180° C. in the endless screw cylinder. Injection molded test rods from this material have the following characteristic values:

Flexible strength: 750 kg. per sq. cm. (Din 53 452)
Impact strength: 85 to 90 cm. kg. per sq. cm. (Din 53 453)
Impact strength with notch: 7 cm. kg. sq. cm. (Din 53 453)
Tensile strength: 550 kg. per sq. cm. (Din 53 455)
Shape stability when heated according to Vicat: 92° C. (Din 57 302).

*Example 5*

To the mixture described in Example 4 there are added while stirring at room temperature 6800 parts of a common salt solution containing 5 parts of common salt dissolved in 95 parts of water. A finely grained suspension is obtained which after standing for 2 hours at a temperature of 80° C. is filtered by suction in known manner and then washed with water at 50° C. until common salt is no longer detectable in the filtrate. The moist material is dried completely on a drying grating for about 20 hours in a circulating air drier with an air temperature of about 70° C.

The dry powder is compacted to a rolled foil by rolling for 30 minutes on double rollers heated to 130° to 140° C. and then processed into injection molded test rods in an injection molding automatic; the test rods have the following characteristic values:

Impact strength: 100 cm. kg. per sq. cm. (Din 53 453)
Flexural strength: 760 kg. per sq. cm. (Din 53 452)
Shape stability when heated according to Vicat: 93° C. (Din 57 302).

Example 6

To the mixture described in Example 4 there are added at room temperature while stirring 6800 parts of a 0.5% aqueous solution of formic acid and the solution rendered neutral by the addition of a 25% ammonia solution. A fine-grained dispersion is obtained which is worked up to dry material as described in Example 3.

It is then compacted on double rollers as described in Example 3 and processed by injection molding into test rods which correspond in their mechanical strength properties approximately to the values given in Example 3.

Example 7

An about 30% dispersion of a copolymer of 90% of styrene and 10% of acrylonitrile is prepared by the method described in Example 1 by using, instead of 300 parts of styrene in the mixture of Example 1, a mixture of 270 parts of styrene and 30 parts of acrylonitrile.

3000 parts of this 30% dispersion are mixed with 420 parts of the dispersion of the copolymer described in Example 2 (c) on a spray roller drier. From the made up dry material, injection molded test rods are obtained having the following characteristic values:

Flexural strength: 780 kg. per sq. cm. (Din 53 452)
Impact strength: 92 cm. kg. per sq. cm. (Din 53 453)
Tensile strength: 720 kg. per sq. cm. (Din 53 455).

Example 8

An about 24% dispersion of a copolymer of butadiene and fumaric acid di-normal-butyl ester is prepared by the method according to Example 2 (a) by using 1337 parts of fumaric acid di-normal-butyl ester instead of 1600 parts, and 2533 parts of butadiene instead of 2270 parts.

500 parts of the said dispersion are mixed with 2930 parts of the 30% polystyrene dispersion described in Example 1 and the mixture processed as in Example 3. Injection molded test rods are obtained having the following characteristic values:

Flexural strength: 720 kg. per sq. cm. (Din 53 452)
Impact strength: 85 kg. per sq. cm. (Din 53 453)
Tensile strength: 540 kg. per sq. cm. (Din 53 455)
Shape stability when hot according to Vicat: 90° S. (Din 57 302).

Example 9

2735 parts of the 30% polystyrene dispersion described in Example 1 are mixed as described in Example 3 with 750 part of the dispersion of copolymer described in Example 2(b) and dried. A dry product is obtained which yields injection molded test rods with the following characteristic values:

Flexural strength: 550 kg. per sq. cm. (Din 53 452)
Impact strength: 110 cm. kg. per sq. cm. (Din 53 453)
Tensile strength: 370 kg. per sq. cm. (Din 53 455)
Shape stability when hot (Vicat): 84° to 85° C. (Din 57 302)
Extensibility: 30% (Din 53 455)

Example 10

3100 parts of the 30% polystyrene dispersion described in Example 1 are mixed in the way described in Example 3 with 290 parts of the dispersion of copolymer described in Example 2(c) and the mixture dried. A dry product is obtained which yields injection molded test rods with the following characteristic values:

Flexural strength: 850 kg. per sq. cm. (Din 53 452)
Impact strength: 45 cm. kg. per sq. cm. (Din 53 453)
Tensile strength: 650 kg. per sq. cm. (Din 53 455)
Shape stability when hot according to Vicat: 94° C. (Din 57 302).

I claim:

1. A mixture of plastics which gives shaped articles of high impact strength consisting of from 70 to 95% by weight of a hard styrene polymer and from 30 to 5% by weight of a copolymer of fumaric acid di-normal-butyl ester and butadiene, this copolymer having been formed by polymerization in aqueous emulsion and containing about 1 to 10 mols of butadiene for each mol of the fumaric acid ester, and the said hard styrene polymer being selected from the group consisting of polystyrene and a copolymer of styrene with another monovinyl compound containing at least 50% of styrene.

2. A mixture of plastics which gives shaped articles of high impact strength consisting of from 70 to 95% by weight of polystyrene and from 30 to 5% by weight of a copolymer of fumaric acid di-normal-butyl ester and butadiene, this copolymer having been formed by polymerization in aqueous emulsion and containing about 1 to 10 mols of butadiene for each mol of the fumaric acid ester.

3. A mixture of plastics which gives shaped articles of high impact strength consisting of from 70 to 95% by weight of a hard styrene polymer and from 30 to 5% by weight of a copolymer of fumaric acid di-normal-butyl ester, butadiene and an unsaturated amide selected from the class consisting of acrylic acid amide and methacrylic acid amide, the said copolymer being formed by polymerization in aqueous emulsion and containing about 1 to 10 mols of butadiene for each mol of the fumaric acid ester and up to 5% of the said unsaturated amide, and the said hard styrene polymer being selected from the group consisting of polystyrene and a copolymer of styrene with another monovinyl compound containing at least 50% of styrene.

4. A mixture of plastics which gives shaped articles of high impact strength consisting of from 70 to 95% by weight of polystyrene and from 30 to 5% by weight of a copolymer of fumaric acid di-normal-butyl ester, butadiene and an unsaturated amide selected from the class consisting of acrylic acid amide and methacrylic acid amide, the said copolymer being formed by polymerization in aqueous emulsion and containing about 1 to 10 mols of butadiene for each mol of the fumaric acid ester and up to 5% of the said unsaturated amide.

5. A mixture of plastics which gives shaped articles of high impact strength consisting of from 70 to 95% by weight of a styrene-acrylonitrile copolymer and from 30 to 5% by weight of a copolymer of fumaric acid di-normal-butyl ester, butadiene and an unsaturated amide selected from the class consisting of acrylic acid amide and methacrylic acid amide, this copolymer being formed by polymerization in aqueous emulsion and containing about 1 to 10 mols of butadiene for each mol of the fumaric acid ester and up to 5% of the said unsaturated amide, and the said styrene-acrylonitrile copolymer containing at least 50% of styrene.

6. Shaped articles having a high impact strength by molding a plastic mixture consisting of from 70 to 95% by weight of a hard styrene polymer and from 30 to 5% by weight of a copolymer of fumaric acid di-normal-butyl ester and butadiene, this copolymer having been formed by polymerization in aqueous emulsion and containing about 1 to 10 mols of butadiene for each mol of the fumaric acid ester, and the said hard styrene polymer being selected from the group consisting of polystyrene and a copolymer of styrene with another monovinyl compound containing at least 50% of styrene.

7. Shaped articles having a high impact strength by molding a plastic mixture consisting of from 70 to 95% by weight of a hard styrene polymer and from 30 to 5% by weight of a copolymer of fumaric acid di-normal-butyl ester, butadiene and an unsaturated amide selected from the class consisting of acrylic acid amide and methacrylic acid amide, the said copolymer being formed by polymerization in aqueous emulsion and containing about 1 to 10 mols of butadiene for each mol of the fumaric acid ester and up to 5% of the said unsaturated amide, and the said hard styrene polymer being selected from the group consisting of polystyrene and a copolymer of styrene with another monovinyl compound containing at least 50% of styrene.

References Cited in the file of this patent

UNITED STATES PATENTS

| | | |
|---|---|---|
| 2,266,794 | Pannwitz et al. | Dec. 23, 1941 |
| 2,614,093 | Wheelock | Oct. 14, 1952 |

FOREIGN PATENTS

| | | |
|---|---|---|
| 710,055 | Great Britain | June 2, 1954 |